United States Patent
Lomp et al.

(10) Patent No.: US 10,342,075 B2
(45) Date of Patent: Jul. 2, 2019

(54) INDUCTION HEATING DEVICE AND INDUCTION HOB COMPRISING AN INDUCTION HEATING DEVICE OF THIS KIND

(71) Applicant: E.G.O. Elektro-Geraetebau GmbH, Oberderdingen (DE)

(72) Inventors: Stephane Lomp, Oberderdingen (DE); Michael Rupp, Eppingen (DE); Siegbert Wein, Kraichtal (DE); Michael Gaertner, Berlin (DE); Konstantin Freis, Bretten (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 404 days.

(21) Appl. No.: 15/179,307

(22) Filed: Jun. 10, 2016

(65) Prior Publication Data
US 2016/0366726 A1 Dec. 15, 2016

(30) Foreign Application Priority Data
Jun. 10, 2015 (DE) .................. 10 2015 210 650

(51) Int. Cl.
*H05B 6/12* (2006.01)
*H01R 13/10* (2006.01)
(Continued)

(52) U.S. Cl.
CPC ....... *H05B 6/1209* (2013.01); *H01R 12/7076* (2013.01); *H01R 13/10* (2013.01);
(Continued)

(58) Field of Classification Search
CPC ...... H05B 6/1209; H05B 6/1245; H05B 6/44; H05B 6/1263; H01R 13/10; H01R 13/506;
(Continued)

(56) References Cited

U.S. PATENT DOCUMENTS

| 4,468,083 A | * | 8/1984 | Lee ..................... H01R 4/20 29/862 |
| 4,909,748 A | | 3/1990 | Kozono et al. |
| 4,910,372 A | * | 3/1990 | Vukich .............. H05B 6/1209 219/624 |

(Continued)

FOREIGN PATENT DOCUMENTS

| DE | 2358561 A1 | 5/1975 |
| DE | 3903839 C2 | 11/1992 |

(Continued)

OTHER PUBLICATIONS

European Patent Office, Extended European Search Report for Application No. 16173460.3, dated Oct. 24, 2016, 9 pages, Germany.

*Primary Examiner* — Hung D Nguyen
(74) *Attorney, Agent, or Firm* — Alston & Bird LLP (57) ABSTRACT

An induction heating device including two induction heating coils and a plug-type contact device has a flat coil carrier for the induction heating coils, the plug-type contact device being arranged on the bottom face of the coil carrier with an insertion direction perpendicular to the surface of the coil carrier. The plug-type contact device has, on the bottom face of the coil carrier, a plug housing being movable with a defined movement travel in a plane parallel to the surface of the coil carrier. The plug housing has four receiving chambers being open at the bottom and having a direction of extent parallel to the insertion direction, in each of which a plug-type contact is arranged. A contact-making line runs from the plug-type contact to the induction heating coil.

23 Claims, 6 Drawing Sheets

(51) Int. Cl.
*H01R 13/506* (2006.01)
*H05B 6/44* (2006.01)
*H01R 12/70* (2011.01)
*H05B 6/04* (2006.01)
*H01R 12/58* (2011.01)
*H01R 12/71* (2011.01)
*H01R 12/75* (2011.01)

(52) U.S. Cl.
CPC ......... *H01R 13/506* (2013.01); *H05B 6/1245* (2013.01); *H05B 6/44* (2013.01); *H01R 12/58* (2013.01); *H01R 12/718* (2013.01); *H01R 12/75* (2013.01); *H05B 2206/022* (2013.01); *Y02B 40/126* (2013.01)

(58) Field of Classification Search
CPC .. H01R 12/58; H01R 12/718; H01R 12/7076; H01R 12/75; Y02B 40/126
USPC ....... 219/620, 622, 623, 624, 625, 632, 655, 219/656, 660, 661, 662, 663, 664, 670, 219/671, 672, 675, 676, 677
See application file for complete search history.

(56) References Cited

U.S. PATENT DOCUMENTS

| | | | |
|---|---|---|---|
| 6,196,856 | B1 | 3/2001 | De Villeroche |
| 7,514,656 | B2 | 4/2009 | Haag |
| 2005/0284862 | A1* | 12/2005 | Keishima ............. H05B 6/1245 219/624 |
| 2016/0135255 | A1 | 5/2016 | Ogawa et al. |

FOREIGN PATENT DOCUMENTS

| | | |
|---|---|---|
| DE | 68911661 T2 | 5/1994 |
| DE | 69913252 T2 | 11/2004 |
| DE | 202004012712 U1 | 1/2006 |
| DE | 102007006280 A1 | 8/2008 |
| DE | 102010044689 A1 | 3/2012 |
| EP | 1463383 A1 | 9/2004 |
| WO | WO 2015/029441 A1 | 3/2015 |
| WO | WO 2015/180956 A1 | 12/2015 |

* cited by examiner

INDUCTION HEATING DEVICE AND INDUCTION HOB COMPRISING AN INDUCTION HEATING DEVICE OF THIS KIND

CROSS-REFERENCE TO RELATED APPLICATIONS

This application claims priority to German Application No. 10 2015 210 650.0, filed Jun. 10, 2015, the contents of which are hereby incorporated herein in its entirety by reference.

TECHNOLOGICAL FIELD

The invention relates to an induction heating device comprising at least one induction heating coil and comprising a plug-type contact device, and also to an induction hob comprising at least one induction heating device of this kind.

By way of example, U.S. Pat. No. 7,514,656 B2 discloses a construction and also a method showing how induction heating coils in an induction heating device or an induction hob can be electrically connected. The critical factor here is the ability to easily achieve the electrical connection. This is not very easy to achieve during assembly since it usually takes place in the induction hob, a plane deeper than that of the induction heating coils.

BACKGROUND

The invention is based on the problem of providing an induction heating device of the kind mentioned in the introductory part and also a corresponding induction hob with which induction heating device and induction hob problems of the prior art can be solved and it is possible, in particular, to simplify, and at the same time configure in as reliable a manner as possible, a design of an induction heating device and also the assembly of the induction heating device and assembly of an induction hob.

This problem is solved by an induction heating device and also by an induction hob. Advantageous and preferred refinements of the invention are the subject matter of the further claims and will be explained in greater detail in the text which follows. In the process, some of the features will be described only for the induction heating device or only for the induction hob. However, irrespective of this, they are intended to be independently applicable both to the induction heating device and also to the induction hob. The wording of the claims is included in the description by express reference.

It is provided that the induction heating device has a coil carrier of flat design or a flat and/or planar coil carrier for at least one induction heating coil. In this case, the coil carrier can substantially be a planar plate, under certain circumstances with an edge which is drawn upwards and/or downwards and reinforcement ribs and also possibly recesses. The plug-type contact device is arranged on the bottom face of the coil carrier, the plug-type contact device having an insertion direction downwards or away from the surface of the coil carrier. The insertion direction is advantageously substantially perpendicular to the surface of the coil carrier. The plug-type contact device has a plug housing which is held or mounted on the bottom face of the coil carrier in such a way that the plug housing can move or has an ability to move in a plane parallel to the surface of the coil carrier. This ability to move is restricted or has a defined and limited or maximum movement travel. This movement travel can lie between 1 mm and 10 mm or even 15 mm, advantageously between 1 mm and 5 mm. In the insertion direction however, the plug-type contact device bears against the coil carrier and does not exhibit any movement travel. This results in a kind of floating mounting of the plug-type contact device or of the plug housing on the coil carrier. Owing to the ability of the plug housing to move substantially perpendicularly to the insertion direction, the plug housing can be matched to the position of the mating plug to a certain degree independently of the position of the coil carrier, so that tolerances can be easily compensated for independently of a necessary change in position of the coil carrier. This simplifies production of an electrical connection or a plug-type connection with the plug-type contact device.

Furthermore, the plug housing has at least two receiving chambers with a direction or a longitudinal direction parallel to the insertion direction, that is to say once again substantially perpendicular to the surface of the coil carrier. The receiving chambers are open at the bottom and a plug-type contact, which is preferably elongate or has a longitudinal extent, is arranged in each of the receiving chambers. This longitudinal extent should once again be parallel to the longitudinal direction of the receiving chambers and therefore to the insertion direction, so that the plug-type contacts are substantially perpendicular to the surface of the coil carrier. Finally, a contact-making line is further provided, the contact-making line preferably running freely and being flexible. The contact-making line runs on the plug-type contact to the induction heating coil, that is to say from two plug-type contacts to an induction heating coil as the electrical connection thereof.

Therefore, a plug-type contact device is provided at the bottom of the induction heating device or of the coil carrier as the mainly fixed and supporting constituent part thereof, the plug-type contact device at the same time allowing the plug-type contact-making connection and therefore an electrical connection to be established by attaching the induction heating device or the coil carrier to the induction hob. Tolerances, inaccuracies or the like can be compensated for owing to the floating mounting or owing to the ability of the plug-type contact device to move in a defined manner relative to the coil carrier with a lateral ability to move. Furthermore, attachment and mounting of the plug-type contact-making connection by hand during assembly of the induction hob can be made more reliable and simpler in this way.

In an advantageous refinement of the invention, precisely two induction heating coils are arranged on the coil carrier. The induction heating coils can be electrically connected to the same plug-type contact device which then has four plug-type contacts. The plug-type contacts are advantageously arranged in a square or rectangle in relation to one another, that is to say not in series. The two induction heating coils are particularly advantageously of identical size and/or identical design. It is possible for such an induction heating device to be configured in a substantially mirror-symmetrical manner, wherein the plug-type contact device lies on the mirror axis. Only the winding directions of the induction heating coils can form a deviation from this mirror-image symmetry.

The abovementioned flexible contact-making line of the plug-type contacts to an induction heating coil is advantageously a wire strand. The wire strand is particularly advantageously the same wire strand as that from which the induction heating coil is wound. Therefore, the abovementioned ability to move or flexibility of the wire strand is also provided. In an advantageous refinement of the invention, a contact-making line to a plug-type contact is a projecting section of the induction heating coil or a projecting section of the wire strand or winding of the induction heating coil, so that the contact-making line transitions from the plug-type contact into the induction heating coil continuously and without interruption.

A contact-making line is preferably fastened to an upper end region of the plug-type contact, but particularly preferably not at the very topmost end. Fastening can be performed by welding or soldering, so that fastening is mechanically stable and electrically safe.

In a refinement of the invention, the plug-type contacts can be plug pins. In another and preferred refinement of the invention, the plug-type contacts are plug sleeves which are in turn mounted onto plug pins. In this case, a diameter of the plug sleeves can lie in the range of between 2 mm and 8 mm in order to be mechanically stable and electrically safe.

In a further refinement of the invention, the plug-type contacts have an outside diameter which is smaller than the inside diameter of the receiving chambers at the respectively corresponding level. Therefore, an ability to move, which is restricted in a defined manner but is free, of the plug-type contacts is also possible in the receiving chambers. In particular, this is an ability to move in the direction transverse to the insertion direction. An ability to move in the form of slight tilting of the plug-type contacts is advantageously possible, so that plug-type contacts, with their longitudinal direction, can tilt a little, advantageously 1° to at most 5° or 10°, in relation to the insertion direction. Therefore, compensation of deviations in the orientation of the plug-type contacts or of plug sleeves and plug pins from the exact insertion direction or perpendicular direction in relation to the surface of the coil carrier is possible. The outside diameter of the plug-type contacts can be 1% to at most 20%, advantageously 3% to 8%, smaller than the inside diameter of the receiving chambers. The clear dimension or the size can therefore be correspondingly lower.

Movable mounting or an abovementioned floating mounting of the plug-type contact device on the coil carrier can be of latching design for example, with latching for a base plate of the plug-type contact device or its plug housing. Therefore, the plug-type contact device can be mounted or held on the coil carrier, advantageously by means of the base plate, in a captive manner but with the ability to move as defined according to the invention. Latching hooks or the like can be provided on several sides of the plug-type contact device or the base plate, advantageously on opposite sides. The latching hooks themselves or similar stops such as side walls can define the maximum ability of the plug housing or the base plate to move on the coil carrier. It can be provided that latching is possible manually, but a latching connection can be released only using a tool or at least a screwdriver.

Furthermore, it is possible that the plug housing is held on two opposite sides by overlapping sections, wherein the plug housing still has the said ability to move freely to lateral stops. Therefore, the plug housing, for example by way of the abovementioned base plate, can be pushed into a kind of pocket on the bottom face of the coil carrier.

A plug housing of the plug-type contact device is advantageously of two-part design. The plug housing can firstly have an abovementioned base plate which is fastened, in particular, to the coil carrier. The base plate should be sufficiently stable for this purpose. The plug-type contact device or the plug housing is mounted on the coil carrier by means of a plug-type contact device receptacle, for example the abovementioned latching hooks or overlapping sections. The plug-type contact device receptacle then defines the abovementioned maximum movement travel of the plug-type contact device or of the plug housing on the coil carrier.

The abovementioned base plate can preferably have a radial holder for the plug-type contacts, in particular in the form of a bore and/or a sleeve section which projects away from the base plate, advantageously in the insertion direction away from the coil carrier. This radial holder effects an abovementioned ability of the plug-type contacts to pivot or to tilt relative to the insertion direction. The radial holder should be somewhat larger than the outside dimension of the plug-type contact for the abovementioned ability to move or ability to pivot.

The plug-type contact device or the plug housing advantageously has a cover which is fastened to, advantageously mounted on, the base plate. Mounting can be performed by means of a latching connection which is automatically established during mounting and, for example, can be released again only using a tool. The cover serves substantially to hold the plug-type contacts on the plug housing or in abovementioned bores and/or sleeve sections on the base plate, that is to say in the receiving chambers. The cover can be fastened to the base plate or mounted on the base plate perpendicular to the surface of the coil carrier. The cover advantageously has one passage opening for each plug-type contact, the plug-type contacts projecting through or protruding through the passage opening and preferably projecting slightly beyond the cover at the bottom. The cover can be fastened to or mounted on the base plate in a fixed manner and in an unmovable position. When the abovementioned passage openings are likewise somewhat larger than the outside diameter of the plug-type contacts in this region, the advantageous ability of the plug-type contacts to pivot or to move relative to the insertion direction can be maintained.

It is possible for the receiving chambers of the plug-type contact devices in which the plug-type contacts are arranged to be formed by receiving sleeves which project away from the abovementioned base plate in the manner of a sleeve section. These sleeve sections form a portion of the lateral holder of the plug-type contacts in the form of receiving chambers. Limiting at the top is formed by the base plate itself, wherein here some of the plug-type contacts can project upward through abovementioned bores. The receiving chambers are bounded at the bottom by the abovementioned cover, wherein one passage opening for each receiving chamber is provided in the cover, the plug-type connection being established through the passage opening. The plug-type contact advantageously projects downwards through the passage opening.

In an advantageous refinement of the invention, the abovementioned contact-making lines run laterally out of the plug-type contact device from the plug-type contacts, preferably between the base plate and the cover. The contact-making lines particularly preferably run out of the abovementioned receiving sleeves which project from the base plate. These receiving sleeves have a lateral slot, so that the contact-making lines can run relatively close to the base plate. Furthermore, it is advantageously provided that the contact-making lines exit from the plug-type contact device in different directions, in particular in opposite directions. Therefore, it is advantageously possible for the plug-type contact device to be arranged between two induction coils, so that the contact-making lines to the induction heating coils are also of approximately identical length.

In order to hold the plug-type contacts securely in the receiving chambers, the plug-type contacts can have a thickened portion or a laterally projecting projection, which can be designed in the manner of a circumferential collar. This thickened portion or the projection is particularly advantageously wider than a passage opening through the cover in order to prevent the cover from slipping through the passage opening. Furthermore, the thickened portion or the projection can lie between the cover and the receiving sleeve on the base plate and limit a movement travel of the plug-type contact along the insertion direction. Therefore, the plug-type contact can be limited, for example, to the abovementioned ability to move or to pivot slightly.

In an advantageous refinement of the invention, the plug-type contact device is arranged close to an outer region or outer edge of the coil carrier. In this case, the plug-type contact device can further be located within the area or projection of the coil carrier and adjoin an outer edge. Therefore, easy optical monitoring is possible when the plug-type connection is being mounted or established.

In a further refinement of the invention, it is possible for a further plug-type connector to be provided on the plug-type contact device for a further plug-type contact-making connection, in particular on an outer face, which is freely accessible, because the coil carrier protrudes only slightly beyond the said plug-type contact device or does not project beyond the plug-type contact device at all. This further plug-type connection can advantageously be fastened by an assembly means which can be mounted and also released again without tools. A latching connection is suitable for this purpose, so that the plug-type contact device carries the further plug-type connector in a piggyback arrangement as it were. Both have the same insertion direction, so that both plug-type connections can be established with a single mounting process. Whereas the plug-type contact device according to the invention can be thought of as a power connection for the induction heating coil, a further plug-type connector can electrically connect, for example, sensor coils or other sensors.

The entire induction hob can have a generator housing beneath a hob plate, a generator component carrier, advantageously a so-called generator printed circuit, being located in the generator housing. Power components and possibly also a controller and also further components are arranged on the generator printed circuit and electrically connected. The induction heating device is arranged above the generator housing. A covering sheet or the like can run between the generator housing and induction heating device. In this case, the plug-type contact device points from the induction heating device at the top downward to the generator component carrier, this also indicating the insertion direction. At least two lower plug-type contacts are arranged on the generator component carrier in a fixed and unmovable manner, the plug-type contacts projecting upwards and the plug-type contact device being mounted on the plug-type contacts. The lower plug-type contacts can be arranged fixedly on the generator component carrier, for example can be pressed directly into the generator component carrier, and electrical contact can be made with the lower plug-type contacts.

In a refinement of the invention, it is possible for the plug-type contacts on the generator component carrier to be plug pins which project upwards, wherein the plug-type contacts of the plug-type contact device of the induction heating device are then abovementioned plug sleeves. The plug pins can be slotted and/or of variable diameter in the longitudinal direction for the purpose of matching the plug pins while at the same time making fixed and safe electrical contact-connection. The plug sleeves are then advantageously plug sleeves of which the diameter cannot be varied. Therefore, the plug sleeves are also easier to produce.

These and further features may be gathered from the claims and also from the description and the drawings, with the individual features being capable of being implemented in each case by themselves or severally in the form of subcombinations in an embodiment of the invention and in other fields and being capable of constituting advantageous and independently patentable versions for which protection is claimed here. The subdivision of the application into individual sections and intermediate headings does not restrict the general validity of the statements made under these.

BRIEF DESCRIPTION OF THE SEVERAL VIEWS OF THE DRAWINGS

Exemplary embodiments of the invention are schematically illustrated in the drawings and will be explained in greater detail in the text which follows. In the drawings.

DETAILED DESCRIPTION

Figure 1:
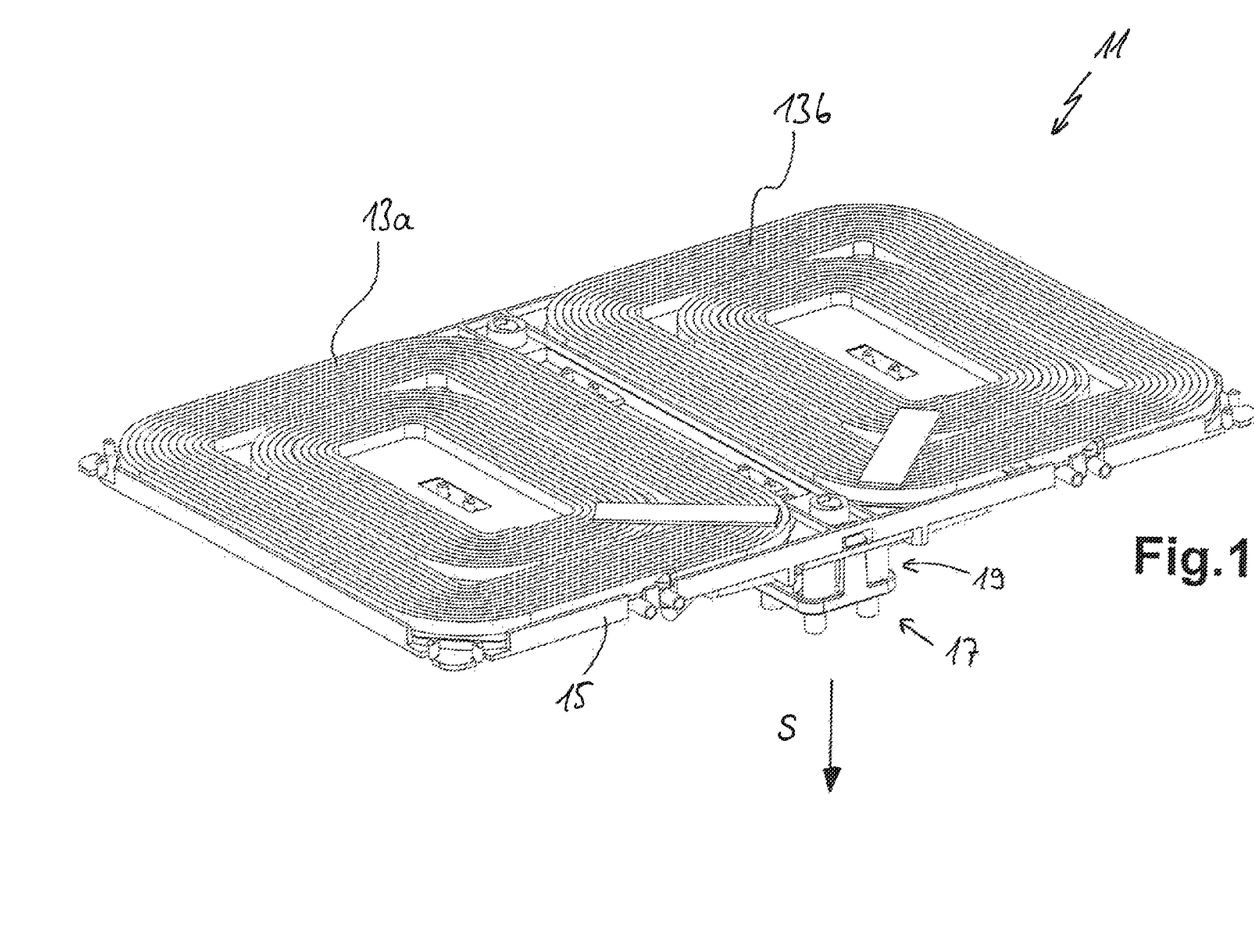
FIG. 1 shows an oblique view of an induction heating device according to the invention comprising a coil carrier, two induction heating coils on the said coil carrier and a plug-type contact device on the bottom face.

FIG. 1 shows an oblique view of an induction heating device 11 according to the invention. The induction heating device has two induction heating coils 13a and 13b which are wound in a planar manner and have an approximately rectangular shape. The induction heating coils 13a and 13b lie on a flat coil carrier 15 which is of partially lattice-like design and carries the two coils. A plug-type contact device 17 according to the invention, which has a plug housing 19, is arranged on a bottom face of the coil carrier 15. The insertion direction S extends downwards or runs substantially perpendicular to the flat extent both of the coil carrier 15 and also of the induction heating coils 13a and 13b.

Figure 2:
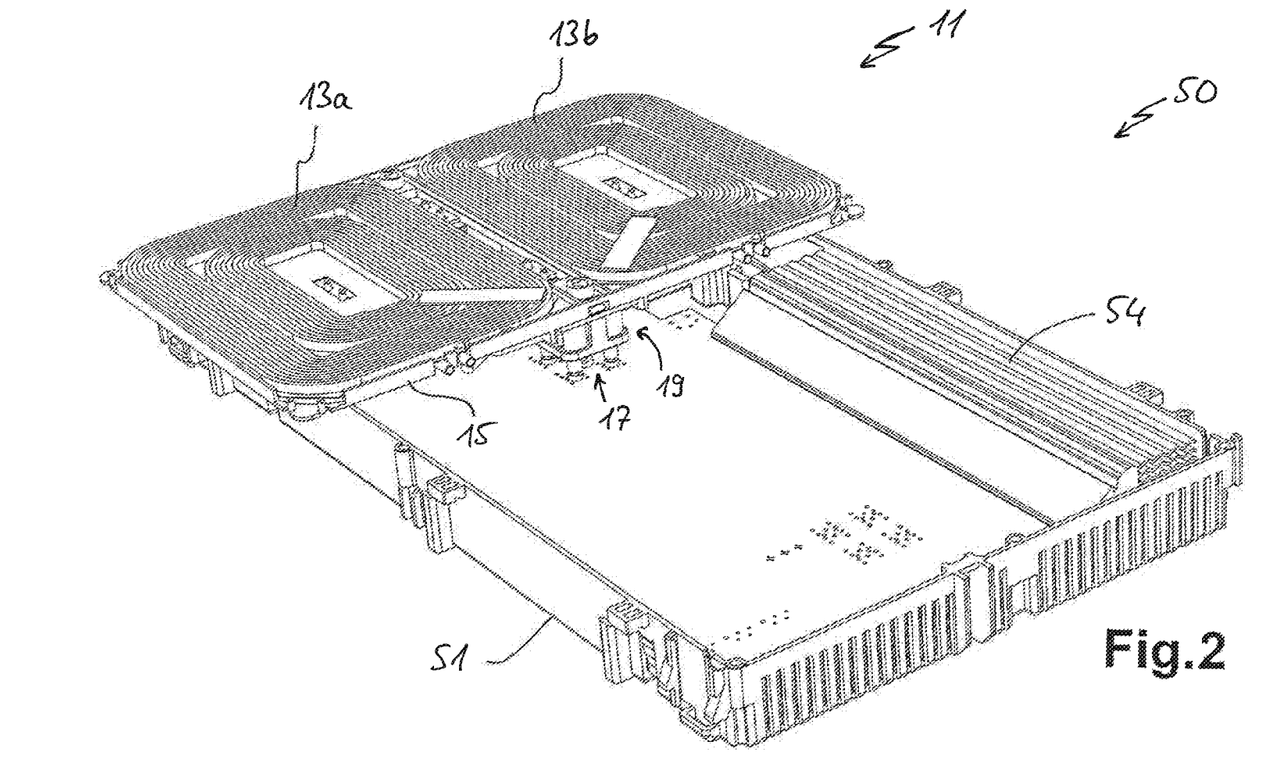
FIG. 2 shows the induction heating device from FIG. 1 on an induction hob.

FIG. 2 shows the induction heating device 11 installed in an induction hob 50 according to the invention, some of the parts of the induction hob having been omitted for the sake of simplicity, specifically a hob plate above the induction heating device, a second induction heating device and a carrying sheet which would run directly beneath the coil carrier 15. The induction hob 50 according to the invention has a generator housing 51 which is designed substantially in the form of a tub and in accordance with the prior art. A generator component carrier 53, usually a large printed circuit board, is arranged in the generator housing 51. A large heat sink 54 is arranged on one side. For the sake of clarity, a large number of further necessary components are not illustrated here, but can be easily realized by a person skilled in the art.

Figure 3:
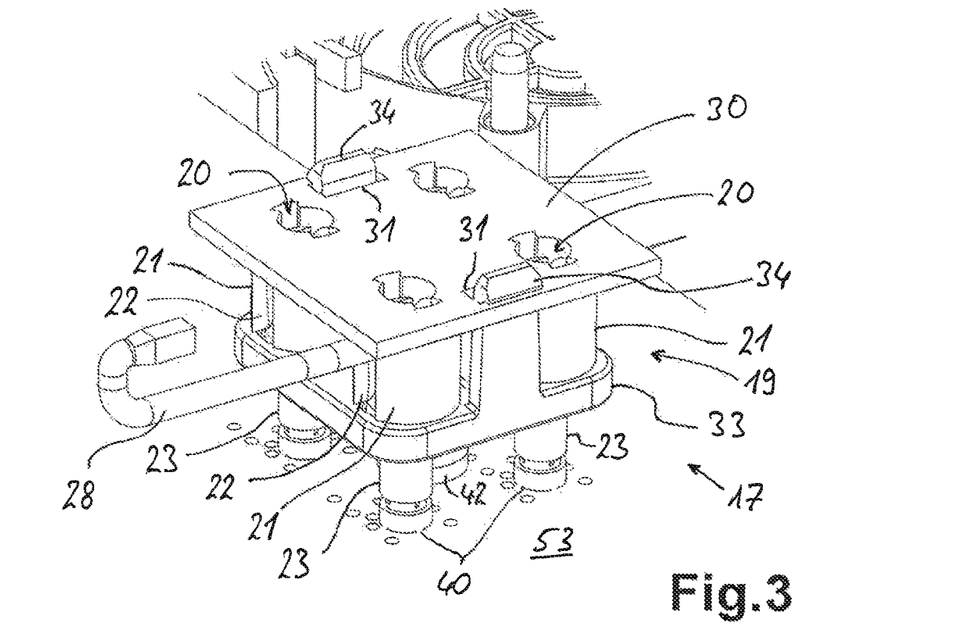
FIG. 3 shows an enlarged illustration of the plug-type contact device, without a coil carrier, on a generator component carrier of the induction hob.
Figure 4:
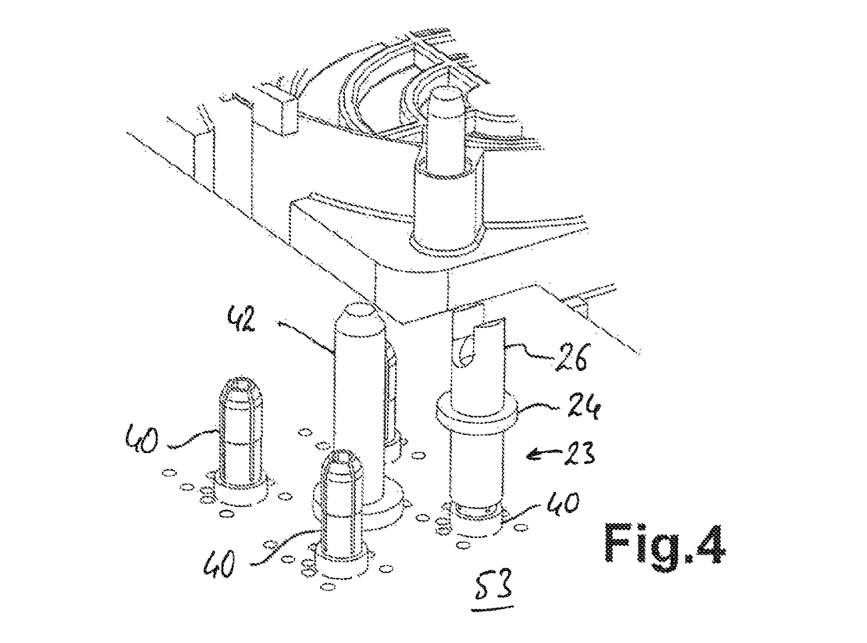
FIG. 4 shows the illustration corresponding to FIG. 3 with the plug-type contact device removed from the generator component carrier.
Figure 6:
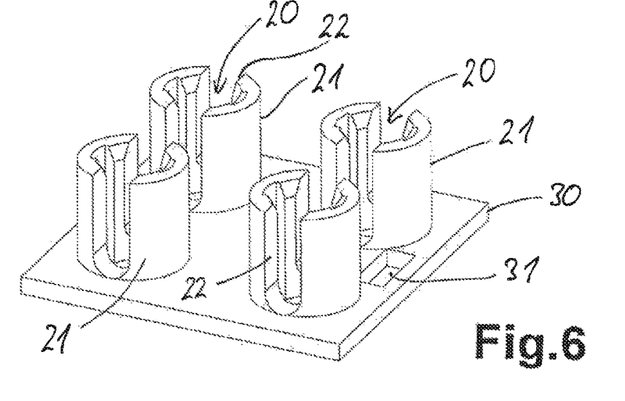
FIG. 6 shows an oblique view of the base plate from FIG. 5 from below.
Figure 7:
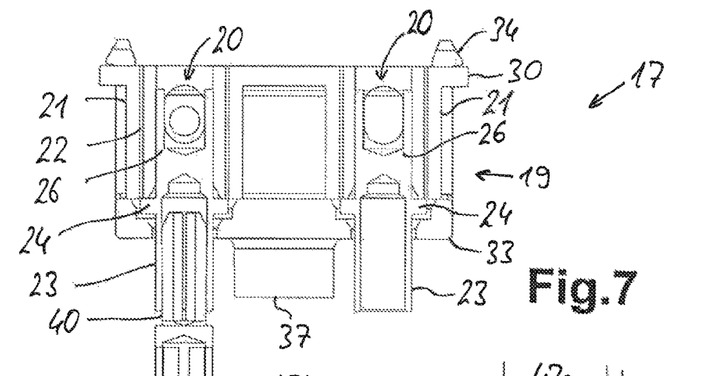
FIG. 7 shows a sectional illustration through the plug-type contact device correspond-ding to FIG. 3 with an inserted plug pin.

The plug-type contact device 17 is mounted on the generator component carrier 53, and therefore electrical contact is made with the plug-type contact device. This electrical contact-connection is illustrated on an enlarged scale in FIGS. 3 and 4, specifically without a coil carrier 15 for the sake of simplicity. FIG. 3 substantially shows the plug-type contact device 17 with the plug housing 19, which has four receiving chambers 20 which are formed substantially by receiving sleeves 21. The receiving sleeves are, as subsequently then shown in FIG. 6, provided with in each case two lateral slots 22. A plug sleeve 23, as can be seen very clearly in the sectional illustration of the plug-type contact device 17 according to FIG. 7, is provided in each of the receiving chambers 20. FIG. 4 also shows a single elongate plug sleeve 23 which has a circumferential collar 24 approximately at the midpoint of its length. A wide continuous slot is provided at the top of a connection section 26, a wire strand 28, illustrated in FIG. 3, being fastened and electrically contacted, for example fixedly soldered or fixedly welded, in the slot. The wire strand 28 is advantageously composed of the same material as the induction heating coils 13a and 13b and is therefore also somewhat flexible. The wire strand forms the flexible contact-making line which runs freely according to FIG. 8.

The receiving chambers 20 or the receiving sleeves 21 are formed on a base plate 30 of the plug housing 19, wherein the receiving chambers 20 are open at the top through corresponding bores in the base plate 30. Furthermore, the base plate 30 further has two rectangular latching openings 31.

Figure 5:
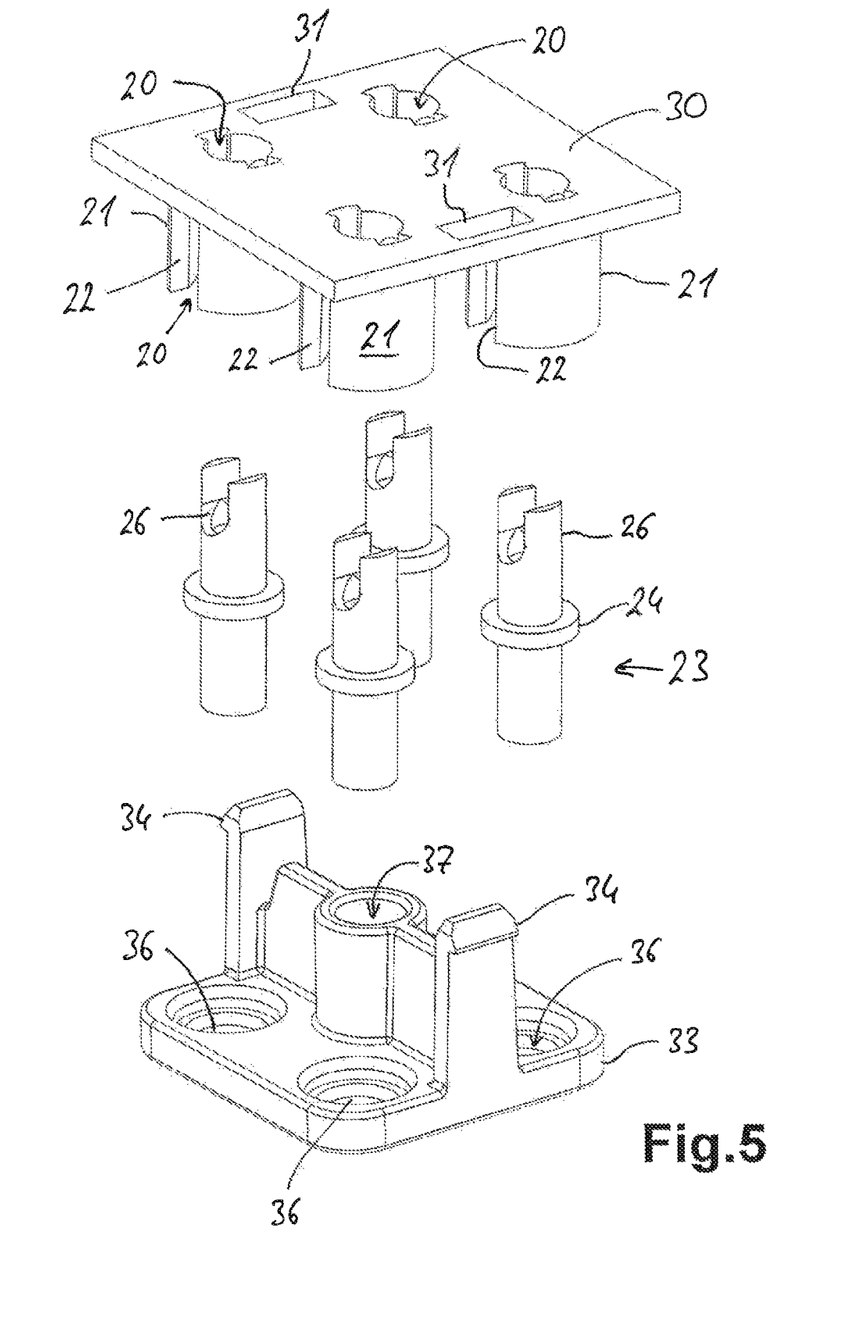
FIG. 5 shows, in an exploded illustration, the plug-type contact device with the plug housing comprising the base plate and the cover, and also plug sleeves arranged between the said base plate and cover.

A cover 33 closes the receiving chambers 20 at least partially at the bottom in order to prevent the plug sleeves 23 from falling out. In the assembled state of the plug housing 19 according to FIG. 3, the cover 33 is fastened to the base plate 30 by means of latching hooks 34 in the latching openings 31. FIGS. 5 and 7 show that passage openings 36 are provided in the cover 33, the passage openings being designed with several steps and with a bevel at the top, the bevel serving to make insertion easier. A deeper region which can receive the collar 24 of the plug sleeves 23 is then provided on the bevel in the upper widest region. The tapered continuous passage opening 36 therebeneath is, as shown in FIG. 7, considerably smaller than the collar 24 and somewhat larger than the outside diameter of the plug sleeve 23 itself. As primarily also shown in the sectional illustration of FIG. 7, the collar 24 is held by the receiving sleeve 21 or the end face of the receiving sleeve at the top and by the stepped form of the passage opening 36 at the bottom. As is clearly shown in FIGS. 3 and 7, the plug sleeves 23 project far beyond the cover 33 at the bottom.

Plug pins 40 are fitted on the generator component carrier 53, the plug pins being pressed into openings in the generator component carrier 53 by way of projecting sections according to FIG. 7. Electrical contact is made by means of soldering. The four plug pins 40 according to FIG. 4 are uniformly distributed and provided with slots in the upper region for flexible and therefore good electrical contact with the plug sleeves 23. FIG. 7 shows, using the sectional illustration, the extent to which a plug pin 40 has been inserted into the plug sleeve 23 along the insertion direction S when contact is established.

Figure 8:
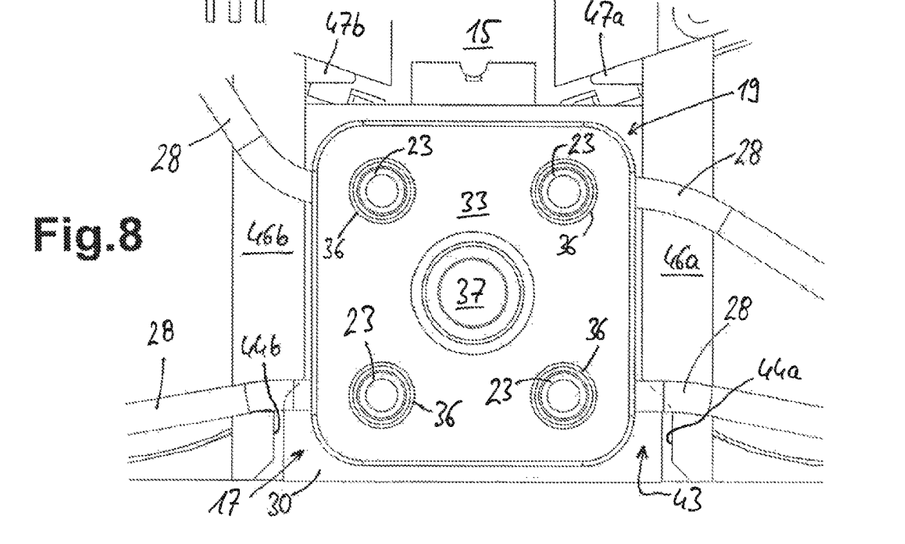
FIG. 8 shows a view of the plug-type contact device on the induction heating device from below.

A centring pin 42 is further provided in order to make it easier to attach the plug-type contact device 17 to the generator component carrier 53. The centring pin protrudes considerably higher than the plug pins 40 and is likewise highly tapered in the upper region. Therefore, when the plug-type contact device 17 is guided on the generator component carrier 53 along the insertion direction S, the centring pin can first be inserted into a centring opening 37 in the cover 33 which is shown in FIG. 8. This provides adequate guidance, so that the plug sleeves 23 are then guided on the plug pins 40 largely in the correct direction along the insertion direction S, so that the plug-type contact device 17 can then be mounted onto the plug pins 40 of the generator component carrier 53 with a corresponding pressure. Compensation of tolerances or inaccuracies during positioning can be achieved by the abovementioned ability both of the plug housing 19 to move on the coil carrier 15 and also of the plug sleeves 23 to move in the plug housing 19 itself.

The lateral slots 22 of the receiving chambers 20 or the receiving sleeves 21 have the advantage, which can be identified from FIG. 8, that two wire strands 28 can exit from the four plug sleeves 23 in each case to the left and to the right here, the wire strands running to the induction heating coils 13. The overall height is kept low owing to the wire strands 28 being guided away laterally in the form of the abovementioned flexible contact-making line. The wire strands 28 are advantageously connected to the plug sleeves 23 before the plug sleeves are inserted into the plug housing 19 or into the receiving chambers 20, that is to say before assembly of the base plate 30 and the cover 33.

The sectional illustration of FIG. 7 further shows that the plug sleeves 23 are not held very tightly in the receiving chambers 20 and also in the passage openings 36, but rather have a certain degree of freedom of movement or play. Therefore, the plug sleeves can be individually displaced to a certain extent in a plane perpendicular to the insertion direction S as compensation. The plug sleeves can primarily be tilted to a certain extent relative to the insertion direction S in order to compensate for position tolerances of the plug pins 40 on the generator component carrier 53 in this way. A slight deviation of the longitudinal direction of the plug pins 40 from the insertion direction S can likewise be compensated for. Nevertheless, the dimensions should be such that the plug sleeves 23 are at least arranged in the plug housing 19 in such an accurate and defined manner that they engage over the tips of the plug pins 40 when the plug-type contact device 17 is guided on the plug pins 40 on the generator component carrier 53 in a defined manner by the centring pin 42 in the centring opening 37, so that plug-type contact is made when the plug sleeves are pushed down in the insertion direction S.

Figure 9:
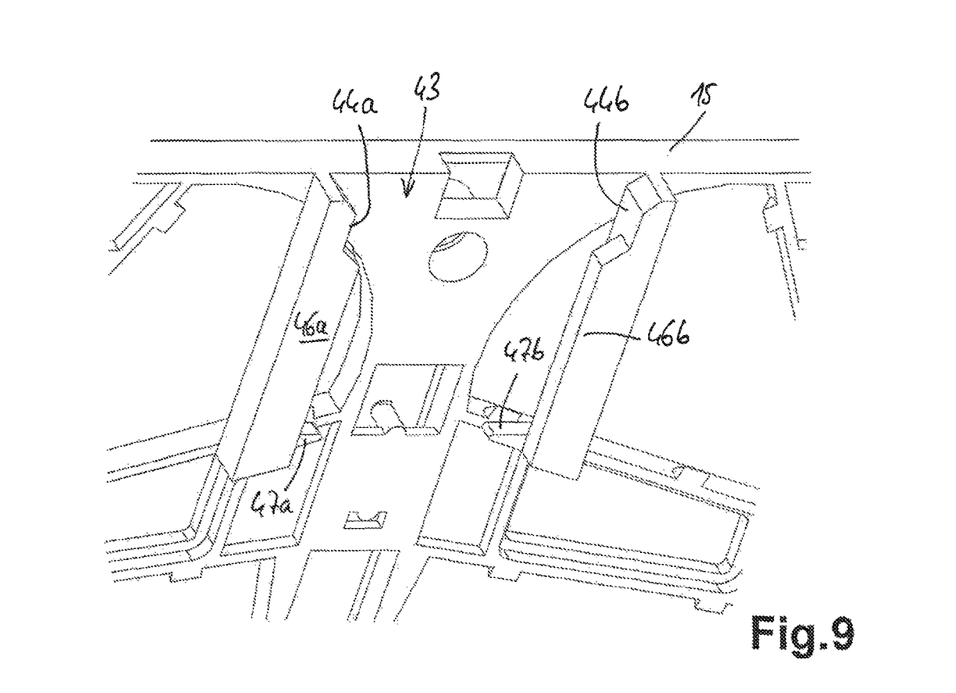
FIG. 9 shows an oblique view of the bottom face of the coil carrier with a plug housing receptacle.
Figure 10:
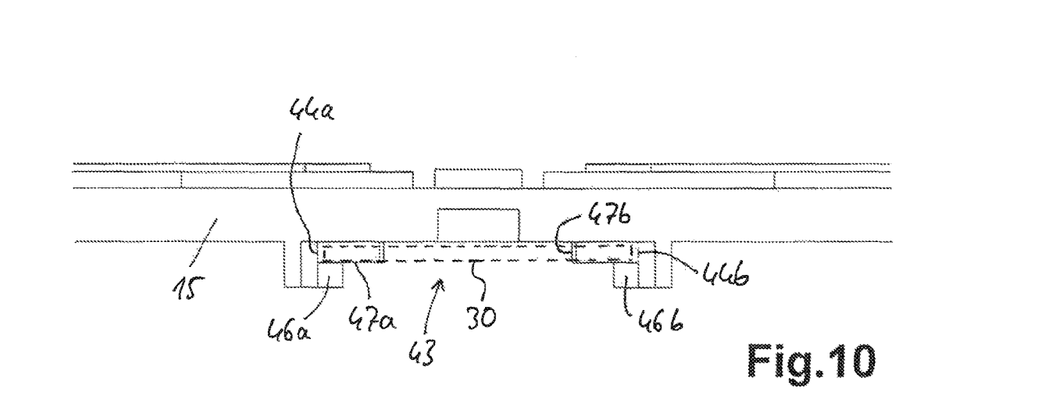
FIG. 10 shows an illustration of the plug housing receptacle from FIG. 9 in the insertion direction of the plug-type contact device.

While slight compensation of tolerances or position faults is achieved by the abovementioned ability of the plug sleeves 23 in the plug housing 19 to move to a certain extent, the plug-type contact device 17 is primarily mounted such that it can move to a certain extent relative to the coil carrier 15. This is explained with reference to FIGS. 8 to 10. FIG. 9 primarily shows that a plug housing receptacle 43 is formed on a bottom face of the coil carrier 15 for a kind of insert. The plug housing receptacle 43 has two side walls 44a on the left and 44b on the right, the side walls having long holding sections 46a and 46b which extend downwards and overlap inwards. Stops 47a and 47b are provided at the rear in order to define a maximum insertion depth. The bottom view of FIG. 8 shows how the lateral outer edges of the base plate 30 are situated beneath the holding sections 46a and 46b but are still at a considerable distance from the side walls 44a and 44b. This is also clear from the illustration of FIG. 10 in which only the base plate 30 of the plug-type contact device 17 on the coil carrier 15 is illustrated in dashed lines. Owing to the width of the base plate 30 in the range of from 1 mm to 3 mm or even 5 mm, which width is lower than the distance of the two side walls 44a and 44b from one another, a correspondingly large, abovementioned movement travel of the plug housing 19 or the plug-type contact device 17 relative to the coil carrier 15 can be achieved in a plane perpendicular to the insertion direction S. An even larger movement travel for the plug-type contact device 17 is provided in the insertion direction into the plug housing receptacle 43, as is likewise shown in FIG. 8. This results in a kind of floating mounting of the plug-type contact device 17 or of the plug housing 19 on the bottom face of the coil carrier 15 with an ability to move in a plane perpendicular to the insertion direction S or parallel to the surface of the coil carrier 15.

That which is claimed:
1. An induction heating device comprising at least one induction heating coil and comprising a plug-type contact device, wherein said induction heating device comprises:
   a coil carrier for said at least one induction heating coil;
   said plug-type contact device is arranged on a bottom face of said coil carrier with an insertion direction perpendicular to a surface of said coil carrier;
   said plug-type contact device comprises a plug housing which is held on said bottom face of said coil carrier in such a way that said plug housing has an ability to move with a defined movement travel in a plane parallel to said surface of said coil carrier;
   said plug housing comprises at least two receiving chambers with a direction of extent parallel to an insertion direction of said plug-type contact device, wherein said receiving chambers are defined by at least two receiving sleeves each open at a bottom side thereof and each having two lateral slots;
   one plug-type contact that is arranged in each of said receiving chambers; and
   one contact-making line attached to each of said plug-type contacts, each contact-making line running freely from said plug-type contact, through the two lateral slots, to said induction heating coil,
   wherein said plug-type contact device is mounted on said coil carrier in a floating manner.
2. The induction heating device according to claim 1, wherein two induction heating coils are arranged on said coil carrier.
3. The induction heating device according to claim 1, wherein said contact-making line of said plug-type contacts to said induction heating coil is a wire strand.
4. The induction heating device according to claim 3, wherein said contact-making line is composed of a same wire strand as that from which the induction heating coil is wound and is a projecting and continuous section of the induction heating coil.
5. The induction heating device according to claim 1, wherein said contact-making line is fastened to an upper end region of the plug-type contact.

6. The induction heating device according to claim 1, wherein said plug-type contacts are plug sleeves for mounting on plug pins.
7. The induction heating device according to claim 1, wherein said plug-type contacts comprise an outside diameter which is 1% to at most 20% smaller than an inside diameter of said receiving chamber at a respectively corresponding level for an ability of said plug-type contacts to move freely in a manner which is restricted to a defined extent in said receiving chambers with a defined movement travel.
8. The induction heating device according to claim 1, wherein said plug-type contact device is mounted on said coil carrier in a floating manner.
9. The induction heating device according to claim 8, wherein said plug-type contact device is mounted on said coil carrier in said floating manner by a latching mounting with latching hooks on several sides for a base plate of said plug housing.
10. The induction heating device according to claim 1, wherein said plug housing of said plug-type contact device comprises two parts with a base plate being held in a plug-type contact device receptacle on said bottom face of said coil carrier such that it is movable laterally with a defined movement travel of said plug-type contact device.
11. The induction heating device according to claim 10, wherein said base plate comprises a radial holder for said plug-type contacts in a form of a bore or in a form of a sleeve section.
12. The induction heating device according to claim 10, wherein said plug-type contact device comprises a cover for mounting on said base plate, wherein a connecting direction of said base plate and said cover is perpendicular to a surface of said coil carrier, wherein said cover for each plug-type contact comprises a passage opening for said plug-type contacts to project through and protrude through.
13. The induction heating device according to claim 10, wherein each of said contact-making lines run laterally out of said plug-type contact device from said plug-type contacts between said base plate and a cover for mounting on said base plate, out of said receiving sleeves which project from the base plate, and through said lateral slots in the receiving sleeves.
14. The induction heating device according to claim 13, wherein each of said contact making lines exit from said plug-type contact device in different directions.
15. The induction heating device according to claim 10, wherein said plug-type contacts comprise a thickened portion or a laterally projecting projection in a manner of a circumferential collar which is wider than a passage opening through a cover for mounting on said base plate.
16. The induction heating device according to claim 15, wherein said thickened portion or said projection is between said cover and said receiving sleeve on said base plate.
17. The induction heating device according to claim 1, wherein said plug-type contact device is arranged on an outer region of said coil carrier.
18. The induction heating device according to claim 17, wherein said plug-type contact device is arranged within a surface of said coil carrier and adjacent to an outer edge thereof.
19. The induction heating device according to claim 1, wherein a plug-type connector is fastened to said plug-type contact device.
20. The induction heating device according to claim 19, wherein said plug-type connector is fastened to an outer face of said plug-type contact device.

21. An induction hob comprising: at least one induction heating device comprising at least one induction heating coil and comprising a plug-type contact device, wherein said induction heating device comprises:
- a coil carrier for said at least one induction heating coil;
- said plug-type contact device is arranged on a bottom face of said coil carrier with an insertion direction perpendicular to a surface of said coil carrier;
- said plug-type contact device comprises a plug housing which is held on said bottom face of said coil carrier in such a way that said plug housing has an ability to move with a defined movement travel in a plane parallel to said surface of said coil carrier;
- said plug housing comprises at least two receiving chambers with a direction of extent parallel to an insertion direction of said plug-type contact device, wherein said receiving chambers are defined by at least two receiving sleeves each open at a bottom side thereof and each having two lateral slots;
- one plug-type contact that is arranged in each of said receiving chambers; and
- one contact-making line attached to each of said plug-type contacts, each contact- making line running freely runs from said plug-type contact, through the two lateral slots, to said induction heating coil,
- wherein said plug-type contact device is mounted on said coil carrier in a floating manner, wherein said induction hob further comprises: a generator housing beneath a hob plate; and a generator component carrier being arranged in said generator housing, wherein said induction heating device is arranged above said generator housing with one of said plug-type contact devices pointing downwardly, wherein at least two upwardly projecting plug-type contacts are arranged on said generator component carrier in a fixed and unmovable manner for mounting said plug-type contact device of said induction heating device.

22. The induction hob according to claim 21, wherein said plug-type contacts on said generator component carrier are plug pins.

23. The induction hob according to claim 22, wherein said plug pins are slotted or are of variable diameter in a longitudinal direction, wherein said plug-type contacts of the plug-type contact device on the induction heating device are plug sleeves.

* * * * *